United States Patent Office 3,558,217
Patented Jan. 26, 1971

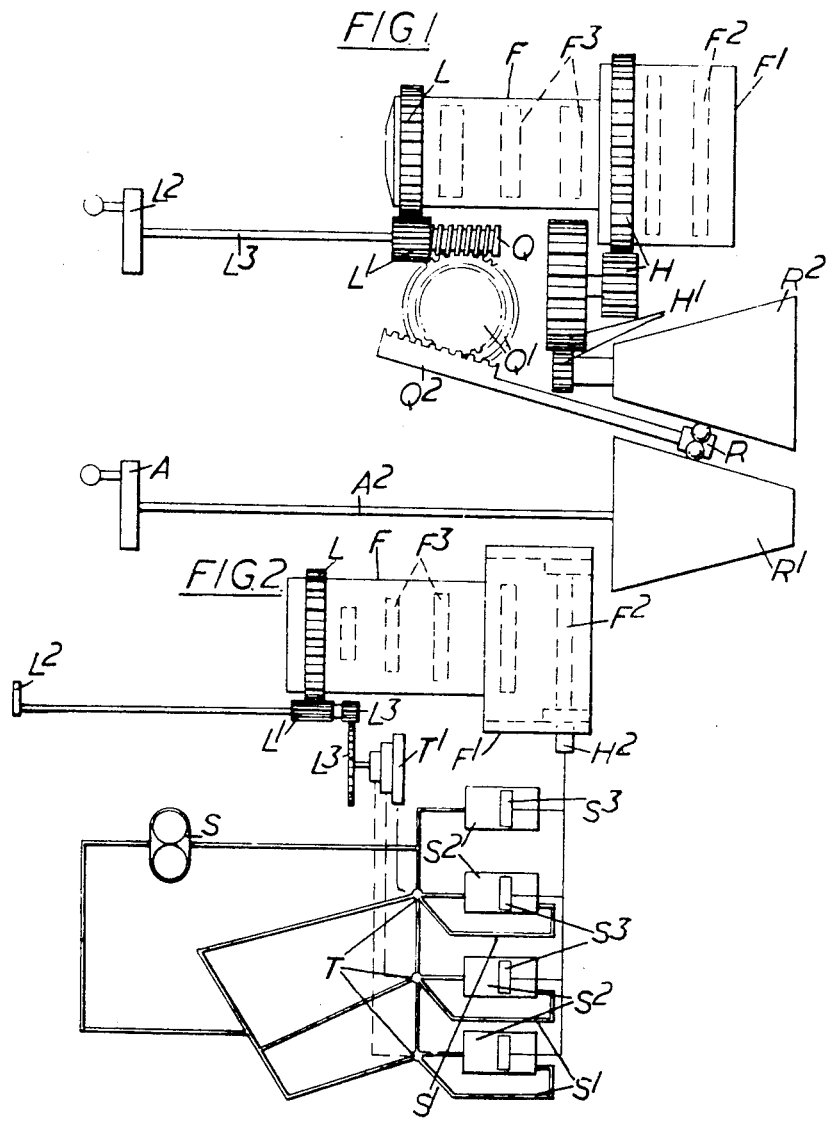

3,558,217
CONTROL DEVICES FOR OPTICAL OBJECTIVES OF VARIABLE EQUIVALENT FOCAL LENGTH
John Denzil Barr and Dexter Robert Plummer, Leicester, England, assignors to Rank Precision Industries Limited, trading as The Rank Organisation, Rank Taylor Hobson Division, Leicester, England, a British company
Original application Jan. 16, 1964, Ser. No. 338,147, now Patent No. 3,399,943. Divided and this application June 26, 1968, Ser. No. 740,206
Claims priority, application Great Britain, Jan. 18, 1963, 2,281/63
Int. Cl. G02b *15/00*
U.S. Cl. 350—187     5 Claims

ABSTRACT OF THE DISCLOSURE

Control device for zoom objectives having focussing controls, said device comprising a mechanical or hydraulic variable ratio transmission, and mechanical means through which the ratio of said transmission is varied by movement of the zoom control element to maintain the apparent sensitivity of the focussing control within predetermined limits.

This application is a division of application Ser. No. 338,147, filed Jan. 16, 1964, now U.S. Pat. No. 3,399,943.

This invention relates to a control device for an optical objective of the kind having members relatively movable under the control of a zoom control element for effecting continuous variation of the equivalent focal length of the objective throughout a range whilst maintaining constant the position of the image plane, and also having part of the objective movable under the control of a focussing control element to suit different object distances.

An optical objective of this kind usually consists of a front assembly including the members relatively movable for zooming purposes, and a rear assembly which remains stationary during the zooming relative movements. The part of the objective movable for focussing usually consists of a part, for example the front member or a part of such front member, of the front assembly.

In such an objective, the depth of focus varies appreciably with variation in the equivalent focal length. For example, in an objective having a maximum equivalent focal length ten times that of the minimum equivalent focal length, the depth of focus at minimum equivalent focal length may be about one hundred times that at maximum equivalent focal length. This is disadvantageous in that the independent focussing control is only of appropriate sensitivity, even within fairly wide acceptable limits, for one portion of the range of variation of equivalent focal length.

The object of the present invention is to provide a control device for an optical objective of variable equivalent focal length wherein the above-described disadvantage may be substantially avoided.

In the control device according to the present invention, means are provided whereby movement of the zoom control element also acts to vary an effective transmission ratio in the transmission between the focussing control element and the movable part of the objective controlled thereby. For rendering the focussing control of appropriate sensitivity throughout the range of zoom, the adjustment means is conveniently arranged to act in such a manner that, for a given operation of the focussing control element, the movement of the part of the objective movable for fussing progressively increases towards the end of the range of zoom corresponding to the smallest equivalent focal length, and vice versa.

With this arrangement, the apparent sensitivity of the focussing control may be maintained substantially constant throughout the range of variation of equivalent focal length if desired, but this will only rarely be necessary, and the arrangement will usually only be such as to maintain the sensitivity within the fairly wide acceptable limits throughout the range of variation of equivalent focal length. However, it should be made clear that the adjustment means may act to vary the said transmission ratio either continuously or in steps, and the term "progressively" is to be interpreted accordingly.

It will be realized that the described arrangement does not permit provision of a simple directly marked focussing scale, on or adjacent to the focussing control element, for the position of such element is not predeterminable since its movement for focussing purposes depends on the setting of the zoom control element. However, although a focussing scale linked with the actual position of the part of the objective movable for focussing purposes may be provided, in practice it is to be appreciated that the operator, using a camera fitted with an objective of variable equivalent focal length, invariably utilizes a monitor screen or analogous sighting screen in effecting adjustments of the objective, so that the provision of a focussing scale is usually rendered unnecessary.

The transmission from the focussing control element to the part of the objective driven thereby is effected in one arrangement through means responsive to the speed of movement of the focussing control element and acting in conjunction with the zoom control element to control the speed of movement of the driven part.

In an alternative arrangement however, the transmission from the focussing control element to the part of the objective controlled thereby is effected through means responsive to the position of the focussing control element and acting in conjunction with the zoom control element to control the speed of movement of the driven part.

It may be mentioned in connection with the above-described arrangements utilizing speed controlling devices, that it is because such devices are speed controlling rather than position controlling that variation of the transmission between the focussing control element and the part of the objective controlled thereby can readily be effected by movement of the zoom control element without affecting the focussing control when the focussing control element is stationary. However, whether such speed controlling devices are employed or not, the sensitivity of the focussing control may be determined by means of a variable speed gearing, interposed in the transmission between the focussing control element and the part of the objective controlled thereby, and adjustable by the zoom control element.

Further features of the invention will be apparent from the practical arrangements of control device, for an optical objective of variable equivalent focal length, now to be described by way of example with reference to the accompanying drawings. The optical objective will be assumed to form part of a camera, for example a television camera, having the objective at its front and the objective controls at its rear, with an adjacent monitor screen for use by the operator.

In the drawings,

FIG. 1 shows a purely mechanical arrangement of control device, and

FIG. 2 shows yet a further arrangement of control device operated partly hydraulically.

One arrangement of control device according to the invention utilizes adjustment means in the focussing transmission in the form of a variable speed gear, for example of the well known ball and disc kind. The drive to the movable part of the objective from the focussing control element may be effected in this instance by a position-controlling transmission mechanism, the variable speed gear preferably being interposed in such drive between the output shaft and the movable part of the objective. One convenient arrangement of position-controlling transmission mechanism for use in such instance utilizes a potentiometer driven by the focussing control hand wheel or lever, and a servo-mechanism providing a feed-back or correcting voltage dependent, not on the speed of movement but on the position of the movable part of the objective. Such position-controlling servo-devices are well known and this arrangement will therefore be clear without illustration.

FIG. 1 shows an arrangement wherein the adjustment means is in the form of a variable speed gear, the arrangement also employing purely mechanical transmissions between the focusing control hand wheel A and part $F^2$ of the objective movable for focussing and between the zoom control element $L^2$ and the parts $F^3$ of the objective movable for zooming. In this arrangement, the zoom control $L^2$ drives the zoom gearing L, $L^1$ directly through a rotary transmission shaft or cable $L^3$, and also acts to operate a worm Q driving gears $Q^1$ which in turn cause sliding movement of an inclined rack element $Q^2$. The rack element $Q^2$ carries the intermediate part R of a variable speed gear of the well known type having two oppositely directed rotatable cones $R^1$, $R^2$ disposed side by side, so that the effective transmission ratio between the two cones $R^1$ and $R^2$ is dependent on the position of the intermediate rotary part R slidable between them. The driving cone $R^1$ is driven directly by the focussing hand wheel A through a rotary transmission shaft or cable $A^2$, while the driven cone $R^2$ drives the focus control gearing H through intermediate gearing $H^1$. With this arrangement, the sensitivity of the focus control is dependent on the position of the zoom control, and thus on the equivalent focal length of the objective as varied by zooming. The variable speed gearing is arranged to act to render the apparent sensitivity of the focus control approximately constant as the equivalent focal length of the objective is altered, the increased depth of field at smaller equivalent focal lengths being compensated for by the larger movement of the movable part of the objective which takes place for a given movement of the focus control.

In a still further arrangement a hydraulic transmission is employed, and the sensitivity adjustment means comprises a swash plate the angle of which can be varied in the well known manner. The swash plate is mechanically linked with the zoom control element to effect variation in the sensitivity of the focussing control in accordance with the variation in the equivalent focal length of the objective.

An alternative arrangement employing hydraulic transmission is indicated diagrammatically in FIG. 2, and serves also to indicate an arrangement wherein the adjustment means associated with the focussing transmission operates in steps instead of continuously. In the arrangement of FIG. 2, a pump S is operable under the control of the focussing control element (not shown) itself to operate the pistons of a number of cylinders and pistons $S^2$, $S^3$, the cylinders $S^2$ being hydraulically connected in parallel and the pistons $S^3$ being mechanically linked to move together. Each cylinder $S^2$, except the first, has a by-pass passage $S^1$ connecting its inlet with the remote end of the cylinder on the side of the piston $S^3$ remote from the inlet. The piston assembly is mechanically linked with a member $H^2$ driving the part $F^2$ of the objective movable for focussing. The effective transmission ratio of this system is varied by cutting out of operation one or more of the cylinders $S^2$. Thus, the inlet to each cylinder $S^2$ (except the first) incorporates a switch-over valve T which is operated under the control of the zoom control element $L^2$. For this purpose, the zoom gearing L, $L^1$ drives intermediate gearing $L^3$ for a cam $T^1$ which is mechanically linked with each of the shut-off valves T so that, during zooming, such cam $T^1$ acts to operate the valves T one after another. Each valve T has two positions, in one of which its associated cylinder and piston $S^2$ and $S^3$ is rendered operative and in the other of which such cylinder and piston are rendered inoperative. In the first of such positions, the valve T connects the cylinder inlet to the pump S and the by-pass passage $S^1$ to the return pipe, while in the second of such positions, the valve blocks the pump flow and return and renders the cylinder $S^2$ inoperative by connecting its two ends together by means of the by-pass passage. In use of this arrangement, during zooming from a small equivalent focal length to a large equivalent focal length, the cam T driven by the zoom control $L^2$ acts to operate the valves $T^1$ one after another so as to render inoperative an increasing number of the cylinders $S^2$, thereby to maintain the focus control of appropriate apparent sensitivity within the fairly wide limits acceptable.

What is claimed is:

1. In an optical objective having a zoom control element, a first part movable under the control of the zoom control element for effecting continuous variation of the equivalent focal length of the objective throughout a range while maintaining constant the position of the image plane, a focus adjusting means comprising, a focussing control element, and a second part of the objective movable under the control of the focussing control element for focussing the objective to suit different object distances;

and in which the extent of movement of said second part required to refocus after a given change in object distance varies in dependence on the position of said first part, the improvement which consists in:
   a variable ratio transmission operatively interconnecting said focussing control element and said second part of the objective;
   means in said transmission for adjusting the transmission ratio thereof; and
   drive means interconnecting the zoom control element and the transmission ratio adjustment means, which drive means adjusts the transmission ratio of the transmission in response to movement of said zoom control element in a direction which alters said transmission ratio so that a given movement of said focussing control element is transmitted by said variable ratio transmission to give respectively a greater or lesser movement of said second part according as the extent of movement of said second part required to refocus after a given change in object distance increases, or decreases, and thereby maintains the apparent sensitivity of adjustment of said focus adjusting means within predetermined limits throughout the zooming range.

2. Apparatus as claimed in claim 1 in which said adjusting means adjusts the ratio of said transmission in discrete steps.

3. Apparatus as claimed in claim 1 in which said adjusting means acts to progressively increase the movement of said movable part of the objective produced by a given movement of the zoom control element as the end of the zooming range corresponding to the smallest equivalent focal length is approached.

4. Apparatus as claimed in claim 1 in which said transmission comprises a driving cone and a driven cone mounted on parallel axes, an intermediate rotary member engaging both cones, and means for adjusting the position of said intermediate member lengthwise of said cones.

5. An optical objective as claimed in claim 1 in which said variable ratio transmission is a mechanical transmission.

References Cited
UNITED STATES PATENTS

| | | | |
|---|---|---|---|
| 1,128,460 | 2/1915 | Kubitz et al. | 74—193 |
| 2,093,604 | 9/1937 | Gallasch | 350—187 |
| 3,059,534 | 10/1962 | Keznickl | 350—187 |
| 3,118,354 | 1/1964 | O'Brien | 350—187 |
| 3,191,496 | 6/1965 | Cook | 350—187 |

PAUL R. GILLIAM, Primary Examiner

U.S. Cl. X.R.

350—44